US007932811B2

(12) United States Patent
Tanabe et al.

(10) Patent No.: US 7,932,811 B2
(45) Date of Patent: Apr. 26, 2011

(54) REMOTE CONTROLLER AND REMOTE CONTROL SYSTEM

(75) Inventors: Hideki Tanabe, Daito (JP); Yasuo Masaki, Daito (JP); Masahiro Takeshita, Daito (JP); Sadanori Murakami, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1007 days.

(21) Appl. No.: 11/805,538

(22) Filed: May 23, 2007

(65) Prior Publication Data

US 2007/0290885 A1 Dec. 20, 2007

(30) Foreign Application Priority Data

May 30, 2006 (JP) ................................ 2006-150298

(51) Int. Cl.

| | |
|---|---|
| ***G08B 13/26*** | (2006.01) |
| ***G05B 19/02*** | (2006.01) |
| ***G06F 7/04*** | (2006.01) |
| ***H04B 1/38*** | (2006.01) |
| ***H04B 1/00*** | (2006.01) |

(52) U.S. Cl. ................ 340/5.64; 340/825.22; 340/5.33; 340/5.61; 340/426.13; 340/815.6; 455/68

(58) Field of Classification Search ....................... None
See application file for complete search history.

(56) References Cited

U.S. PATENT DOCUMENTS

| | | | | |
|---|---|---|---|---|
| 6,665,384 | B2 * | 12/2003 | Daum et al. | 379/102.03 |
| 7,023,498 | B2 * | 4/2006 | Ishihara | 348/734 |
| 7,697,492 | B2 * | 4/2010 | Petite | 370/338 |
| 2004/0177817 | A1 * | 9/2004 | Bradenbaugh | 122/13.01 |
| 2007/0037522 | A1 * | 2/2007 | Liu et al. | 455/68 |

FOREIGN PATENT DOCUMENTS

| | | |
|---|---|---|
| JP | 10-98780 | 4/1998 |
| JP | 2004-48467 | 2/2004 |
| JP | 2005-341468 | 12/2005 |

OTHER PUBLICATIONS

Patent Abstracts of Japan for Japanese Publication No. 10-098780, Publication date Apr. 14, 1998 (1 page).
Patent Abstracts of Japan for Japanese Publication No. 2004-048467, Publication date Feb. 12, 2004 (1 page).
Patent Abstracts of Japan for Japanese Publication No. 2005-341468, Publication date Dec. 8, 2005 (1 page).

* cited by examiner

*Primary Examiner* — Davetta W Goins
*Assistant Examiner* — Fekadeselassie Girma
(74) *Attorney, Agent, or Firm* — Osha Liang LLP

(57) ABSTRACT

A remote controller that can infer the intention of a user and that can control a plurality of devices based on the inferred intention is provided. A remote controller includes memory, a control circuit, and a transmission portion. The memory stores in advance, in association with a situation sensed by a sensor, information of a first control signal. The control circuit generates, in association with the situation sensed by the sensor and the information stored in the memory, the first control signal. The transmission portion transmits the first control signal generated by the control circuit.

10 Claims, 15 Drawing Sheets

FIG.14

| EVENT | SITUATION SENSED BY SENSOR | | | | | | | CONTENT OF CONTROL | | | | | | | |
|---|---|---|---|---|---|---|---|---|---|---|---|---|---|---|---|
| | AIR CONDITIONER | REMOTE CONTROLLER | VESTIBULE LIGHT | LIGHT OF JAPANESE-STYLE ROOM ON THE SECOND FLOOR | TELEPHONE | FOOTLIGHT | SECURITY LIGHT | AIR CONDITIONER | VESTIBULE LIGHT | LIGHT OF JAPANESE-STYLE ROOM ON THE SECOND FLOOR | FOOTLIGHT | SECURITY LIGHT | TELEVISION SET | HDD RECORDER | LIVING ROOM LIGHT |
| COMING HOME | OFF | OFF | ON | OFF | OFF | OFF | ON | ON | ON | ON | ON | OFF | ON | ON | ON |
| BEGINNING OF MEALTIME | – | OFF | OFF | – | ON | ON | OFF | ON | OFF | – | ON | OFF | ON | ON | ON |
| GOING TO BED | OFF | OFF | OFF | ON | OFF | OFF | – | OFF | OFF | OFF | OFF | OFF | OFF | OFF | OFF |
| BEFORE GOING TO WORK | OFF | OFF | OFF | OFF | ON | OFF | OFF | OFF | OFF | OFF | OFF | OFF | OFF | OFF | OFF |
| ENTER LIVING ROOM | – | ON | – | – | – | – | – | ON | OFF | OFF | OFF | OFF | ON | ON | ON |

REMOTE CONTROLLER AND REMOTE CONTROL SYSTEM

BACKGROUND OF THE INVENTION

1. Field of the Invention

The present invention relates to a remote controller and a remote control system, and particularly, to a remote controller and a remote control system that apply a control signal to a selected apparatus.

2. Description of the Background Art

Japanese Patent Laying-Open No. 10-098780 discloses a remote control repeater, including: a plurality of remote controller signal transmitters including a dedicated remote controller signal transmitter and a remote controller signal transmitter associated with at least one controlled device; and a remote controller signal transceiver receiving a first remote control signal being transmitted and sending a second remote control signal to the controlled device. The dedicated remote controller signal transmitter includes a device transmitting a mode select signal of at least a memory write mode and a memory read mode. The remote controller signal transceiver includes memory, a device storing a remote controller signal from the remote controller signal transmitter associated with the controlled device in a prescribed area on the memory when the mode select signal is of the memory write mode, and a device reading the remote control signal from the area on the memory and transmitting it to the controlled device when the mode select signal is of the memory read mode.

According to the invention disclosed in Japanese Patent Laying-Open No. 10-098780, the manipulation of one remote controller allows a plurality of devices, even those at remote locations or behind obstacles, to operate simultaneously or with a certain delay.

Japanese Patent Laying-Open No. 2004-048467 discloses a remote control system including a device body and a remote controller realizing remote control of the device body. The remote controller converts an infrared signal into a radio wave signal and transmits it to the device body. The device body converts this radio wave signal into an infrared signal and returns an acknowledge signal for the receipt of the signal to the remote controller.

The invention disclosed in Japanese Patent Laying-Open No. 2004-048467 realizes simultaneous use of a plurality of remote controllers, simultaneous manipulation of a plurality of device bodies with one remote controller, bidirectional communication between the remote controller and the device body, and checking if the signal of the remote controller has been received by the device.

Japanese Patent Laying-Open No. 2005-341468 discloses an electric device linked control system, including a plurality of electric devices operating in association in response to a control signal transmitted from one remote controller. At least one of the electric devices includes a reception portion receiving a control signal transmitted from a remote controller responding to a further electric device used in association with the one electric device, a transmission portion transmitting a control signal for the further electric device used in association with the one electric device to the further electric device used in association with the one electric device, and a control portion exerting control of transmitting a control signal for the further electric device when the reception portion receives a control signal for the corresponding remote controller.

The invention disclosed in Japanese Patent Laying-Open No. 2005-341468 saves users the trouble of, when they use a plurality of electric devices with remote controllers in association, operating respective corresponding remote controllers of the electric devices.

On the other hand, the inventions according to Japanese Patent Laying-Open No. 10-098780, Japanese Patent Laying-Open No. 2004-048467, and Japanese Patent Laying-Open No. 2005-341468 involve a problem that control desired by a user cannot be exerted unless the user clearly expresses his/her intention.

Specifically, when a plurality of devices are controlled in a control system widely employed currently, it is necessary to send control signals for a plurality of times. For example, when a user leaves a room, he/she must turn off respective power supplies of all the devices, such as a television set, a videocassette recorder, an air conditioner and the like. This is very troublesome.

SUMMARY OF TH INVENTION

The present invention has been made to solve the above-described problem, and an object thereof is to provide a remote controller and a remote control system that can infer the intention of a user and that can control a plurality of devices based on the inferred intention.

In summary, according to one aspect of the present invention, a remote controller controlling a plurality of devices each including a sensor and a transmitter connected to the sensor is provided. The remote controller includes: memory storing, in association with combinations of situations respectively sensed by the sensors, pieces of information of control signals respectively controlling the devices; a reception portion receiving signals respectively representing situations respectively sensed by the sensors; a control circuit generating, in association with the combinations of the situations represented by a plurality of signals received in serial order by the reception portion with a reception interval being at most a predetermined threshold value, and with the pieces of information stored in the memory, control signals respectively controlling the plurality of devices; and a transmission portion transmitting the generated control signals as infrared signals.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 14 shows an event table and the content of control executed when a control signal is transmitted.

DESCRIPTION OF THE PREFERRED EMBODIMENTS

Figure 1:
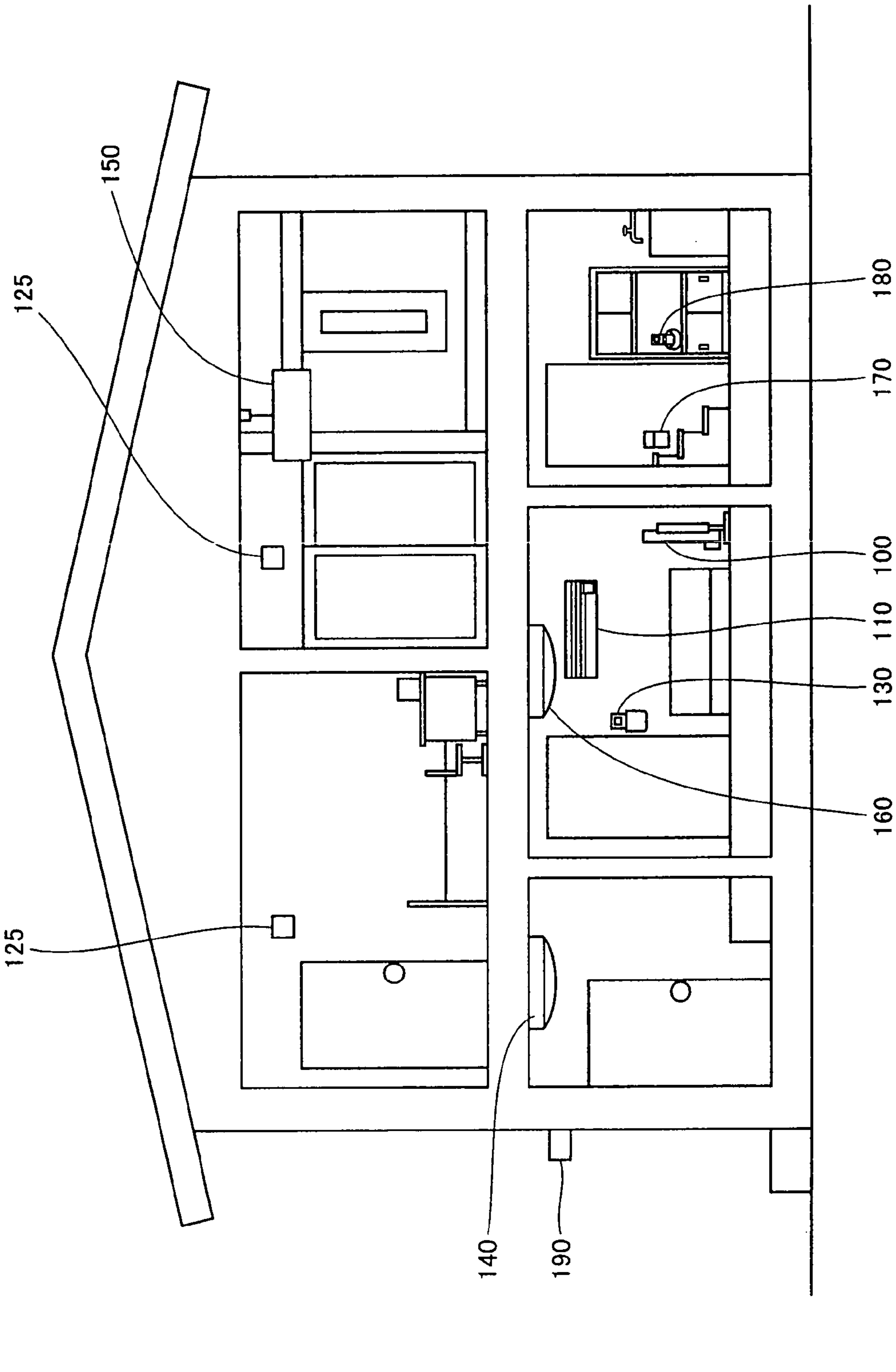
FIG. 1 shows a house where a control system according to an embodiment of the present invention is installed.

In the following, referring to the drawings, an embodiment of the present invention will be described. In the following description, the same components are denoted by the same reference characters. Their names and functions are also the same. Accordingly, detailed description thereof will not be repeated.

FIG. 1 shows a house where a control system according to the present embodiment is installed. Referring to FIG. 1, the control system according to the present embodiment includes a television set 100, an air conditioner 110, a pyroelectric sensor 125, a remote controller 130, a light 140 of a vestibule (hereinafter referred to as vestibule light 140), a light 150 of a Japanese-style room on the second floor, a light 160 of a living room (hereinafter referred to as living room light 160), a footlight 170, a telephone 180, and a security light 190.

Television set 100 receives a broadcast signal and displays an image. Air conditioner 110 adjusts the temperature of the room. Pyroelectric sensor 125 senses the movement of humans. Remote controller 130 receives a trigger signal from television set 100, air conditioner 110, pyroelectric sensor 125, vestibule light 140, light 150 of the Japanese-style room on the second floor, living room light 160, footlight 170, telephone 180, or security light 190, and transmits control signals to television set 100 and air conditioner 110. Vestibule light 140, light 150 of the Japanese-style room on the second floor, living room light 160, and footlight 170 illuminate the rooms. Telephone 180 communicates with an external telephone through a telephone line. Security light 190 illuminates the outside of the vestibule.

Figure 2:
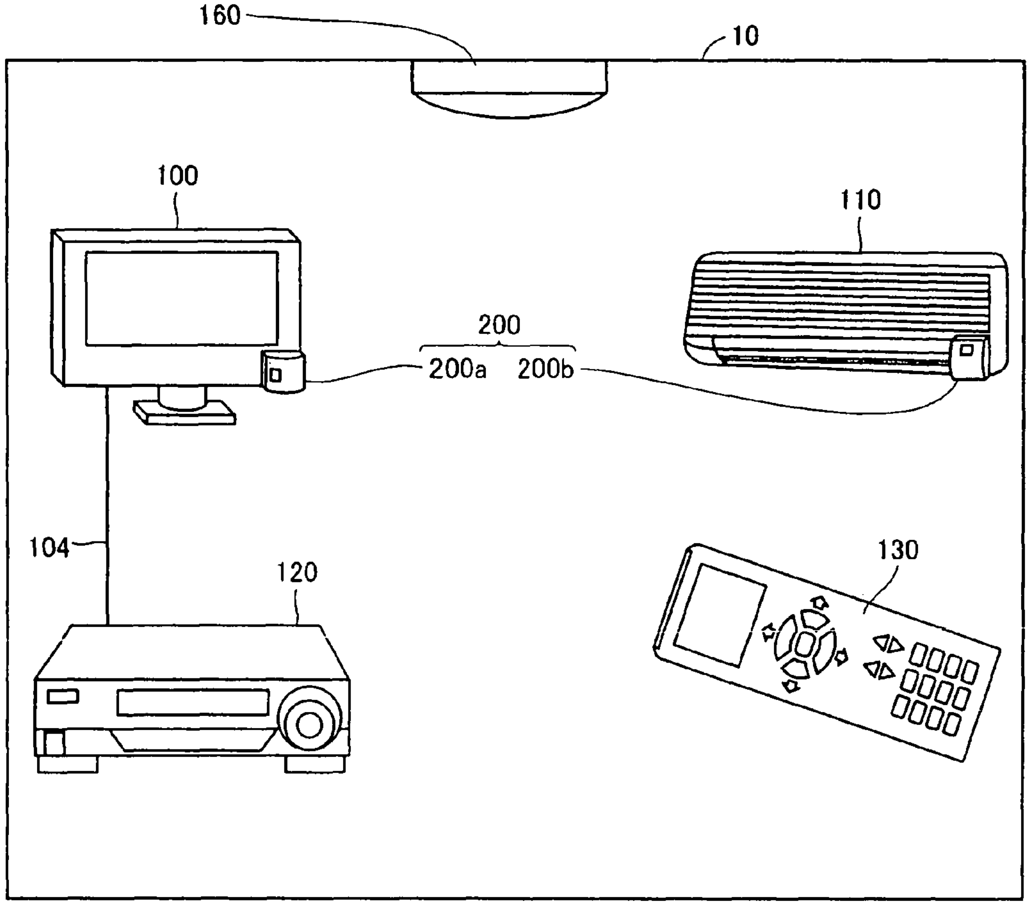
FIG. 2 shows a room where an electronic device having a remote controller adapter attached is arranged.

FIG. 2 shows a living room 10 in the house shown in FIG. 1, where an electronic device having a remote controller adapter 200 attached is arranged.

In living room 10, television set 100, air conditioner 110, an HDD recorder 120, and light 160 of the living room are arranged. Television set 100 and HDD recorder 120 are connected through a cable 104. A remote controller adapter **200*a* is attached to a front panel of television set 100. Similarly, a remote controller adapter 200*b* is attached to a front surface of air conditioner 200. Remote controller adapter 200*a* and remote controller adapter 200*b* are generally referred to as remote controller adapter 200**.

In living room 10, remote controller 130 is further arranged. Remote controller 130 includes a transmission portion 850 outputting a signal for controlling the operation of the electronic devices. Transmission portion 850 emits a control signal in accordance with a predetermined angle. The control signal is infrared light, for example.

Figure 3:
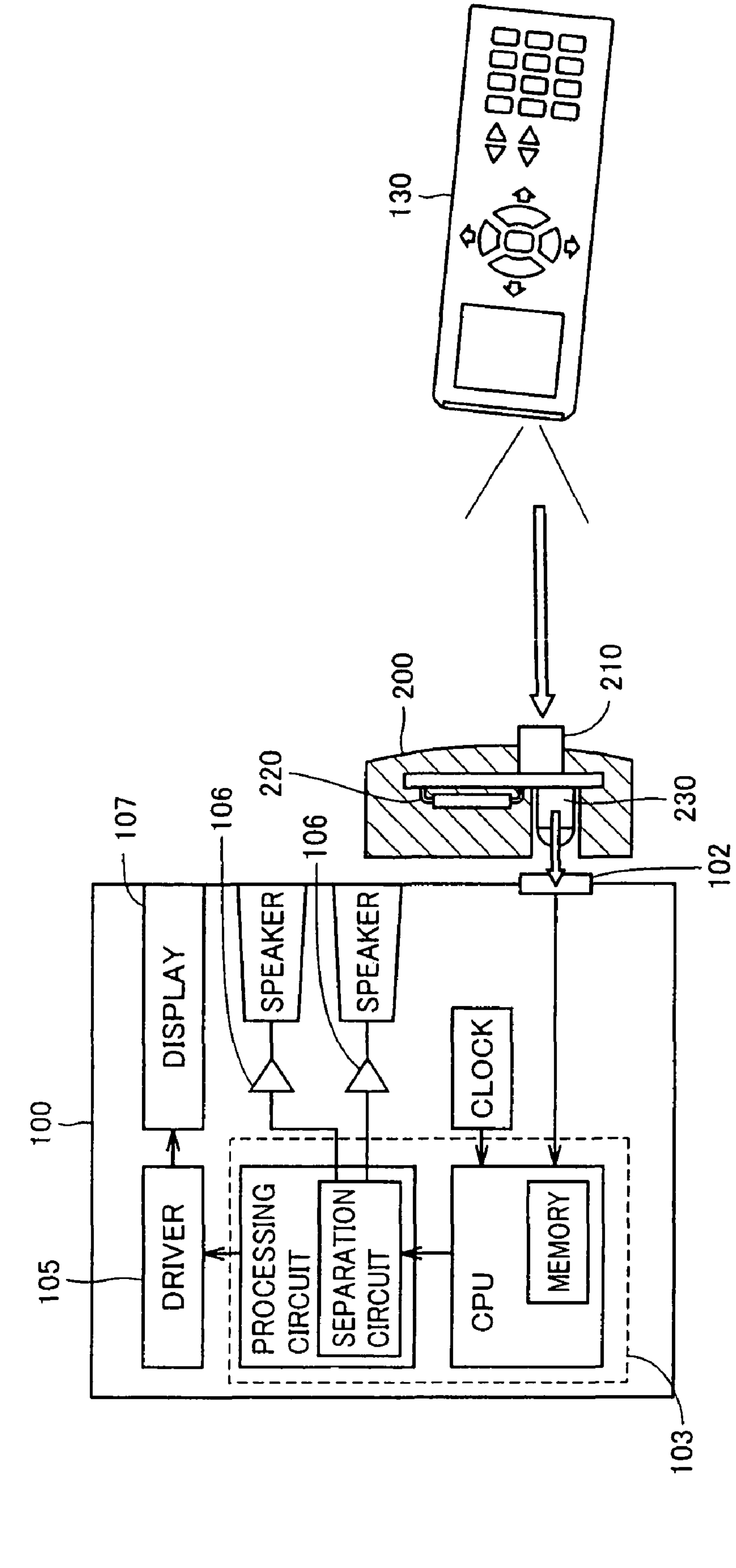
FIG. 3 shows one manner of attaching the remote controller adapter to a television set.

Referring to FIG. 3, an attaching manner of remote controller adapter 200 will be described. FIG. 3 shows one manner of attaching, remote controller adapter 200 to television set 100.

Remote controller adapter 200 is attached to television set 100, for example with an adhesion tape, an attachable/removable fabric tape, and other attaching member (not shown) being interposed, such that a control signal transmission portion 230 and a remote controller light reception portion 102 oppose to each other. That is, a control signal transmitted from control signal transmission portion 230 is received by remote controller light reception portion 102. Remote controller adapter 200 includes a reception portion 210 receiving a control signal externally provided.

On a front surface (i.e., the surface where display 107 is arranged) of television set 100, a light reception portion 102 receiving a control signal transmitted from remote controller 130 is arranged. Television set 100 further includes a display 107 displaying an image, a control circuit 103 controlling an operation of television set 100 based on the control signal received by light reception portion 102, a driver 105 realizing display of an image by sending an image signal to display 107 based on a signal output from control circuit 103, and an amplifier 106 amplifying an audio signal output from control circuit 103. When a control signal includes a channel selection instruction, control circuit 103 outputs a tuning command to a tuner (not shown). When a control signal includes a volume-up instruction or volume-down instruction, control circuit 103 sends, based on the instruction, an instruction of increasing or reducing the intensity of the audio signal to amplifier 106. Since the operation of television set 100 is well known, detailed description thereof is not repeated herein.

The attaching manner of remote controller adapter 200 is not limited to the foregoing example. A magnet may be employed, or it may be of stationary type. For example, when a device installed at an overhead location such as air controller 110, a magnet or an adhesion tape is preferable in ensuring the attachment.

Figure 4:
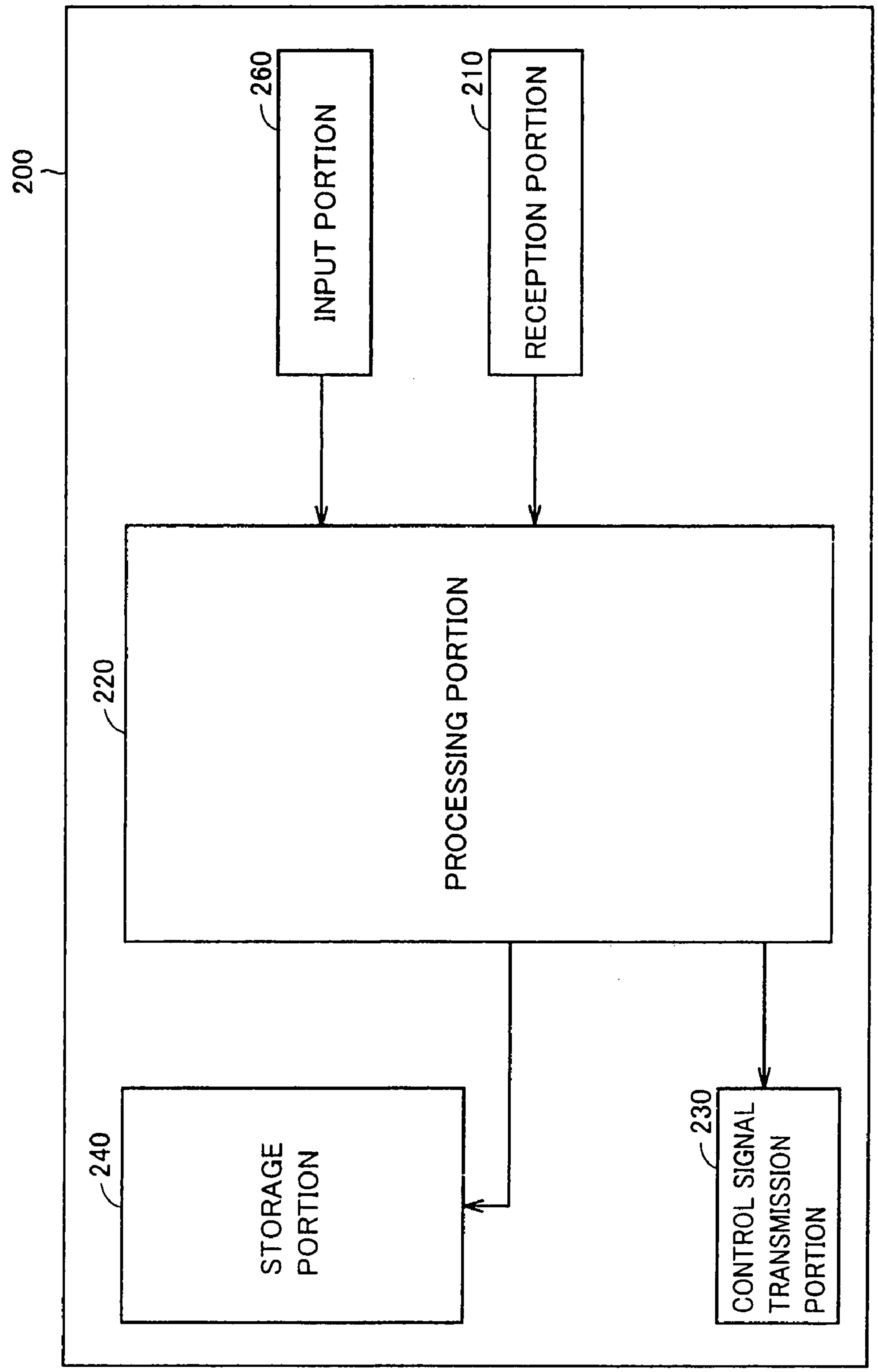
FIG. 4 is a block diagram showing a functional configuration of the remote controller adapter.

Referring to FIG. 4, a configuration of remote controller adapter 200 will be described. FIG. 4 is a block diagram showing a functional configuration of remote controller adapter 200. Remote controller adapter 200 includes a reception portion 210, a processing portion 220, a control signal transmission portion 230, a storage portion 240, and an input portion 260.

Reception portion 210 receives a signal transmitted from remote controller 130, and transfers the signal to processing portion 220. Processing portion 220 obtains information contains in the signal. Processing portion 220 detects whether or not the signal received by reception portion 210 is a control signal for controlling a specific device or a control signal representing a broadcast command (in the present embodiment, the control signal representing the broadcast command is referred to as a "broadcast signal"). Sensing reception of the control signal, processing portion 220 generates, based on the control signal, a control signal for controlling a device. Control signal transmission portion 230 converts the signal generated by processing portion 220 into an infrared signal and transmits it. Storage portion 240 stores in advance remote control code data of the control signal transmitted from control signal transmission portion 230, for example.

Processing portion 220 converts the signal into a signal format to be transmitted as remote control code to the device, and sends it to control signal transmission portion 230. In this manner, irrespective of the signal transmission function of remote controller 130, the signal sent from remote controller 130 for controlling the device is transmitted from control signal transmission portion 230 in a format conforming to the device. Accordingly, a malfunction of a device attributed to mismatch of the format of a control signal can be prevented.

Figure 5:
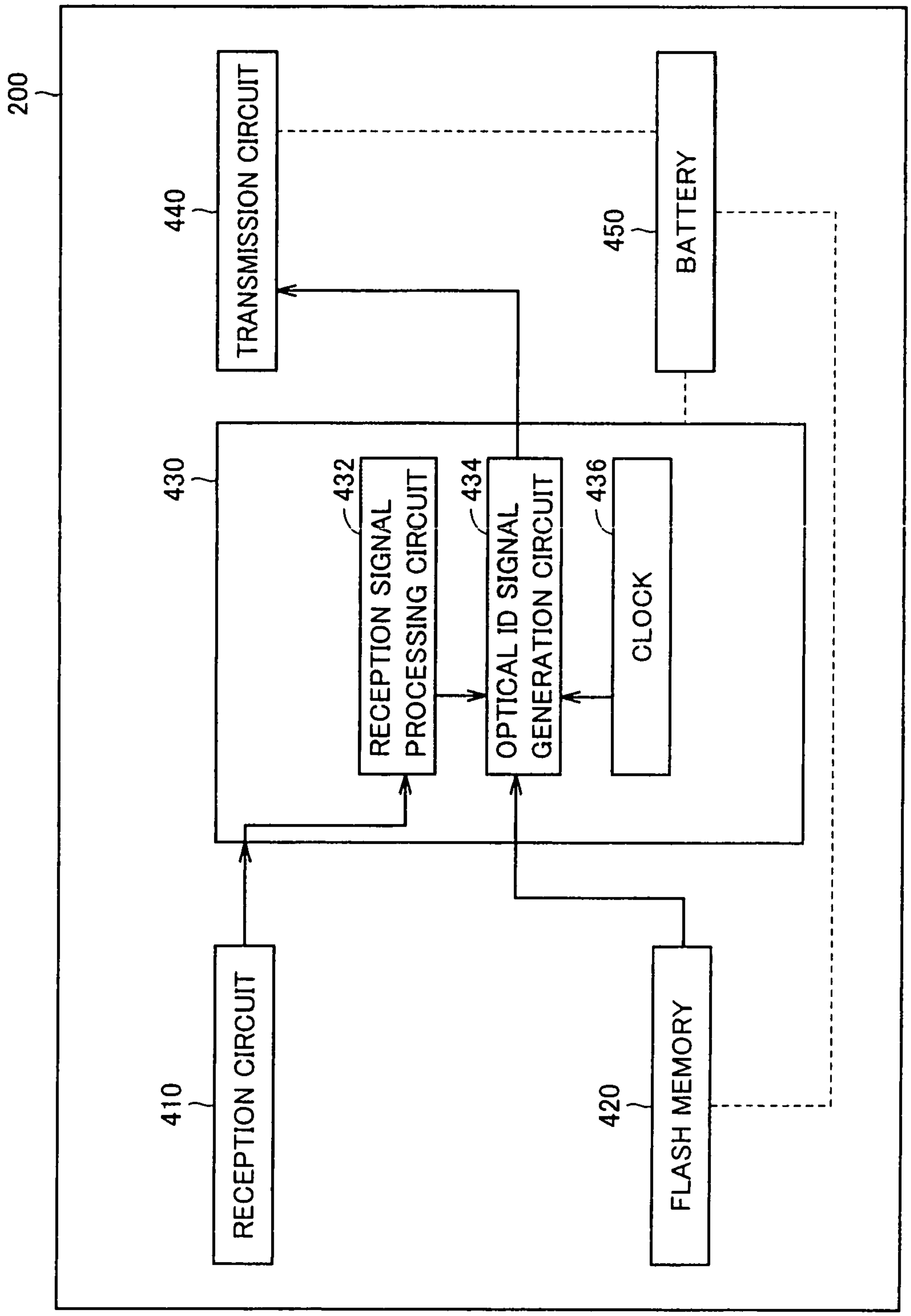
FIG. 5 is a block diagram showing a hardware configuration of the remote controller adapter.

Referring to FIG. 5, the configuration of remote controller adapter 200 will further be described. FIG. 5 is a block diagram showing a hardware configuration of remote controller adapter 200. Remote controller adapter 200 includes: a reception circuit 410 accepting an externally input signal; flash memory 420 storing data in a non-volatile manner; a control circuit 430 generating, based on the signal received by reception circuit 410 and the data stored in flash memory 420, a signal to be transmitted to a device having remote controller adapter 200 attached; a transmission circuit 440 converting the signal generated by control circuit 430 into an infrared signal and transmitting it; and a battery 450 supplying electric power for driving remote controller adapter 200.

Control circuit 430 includes: a reception signal processing circuit 432 that receives an input of the signal sent from reception circuit 410 to obtain information contained in the signal; an optical ID signal generating circuit 434 generating, based on the information obtained by reception signal processing circuit 432 (for example a broadcast command) and the data stored in flash memory 420, control information to be transmitted as an infrared signal; and a clock 436 detecting time.

It is noted that, in the present embodiment, HDD recorder 120 includes hardware similarly to that of remote controller adapter 200.

Figure 6:
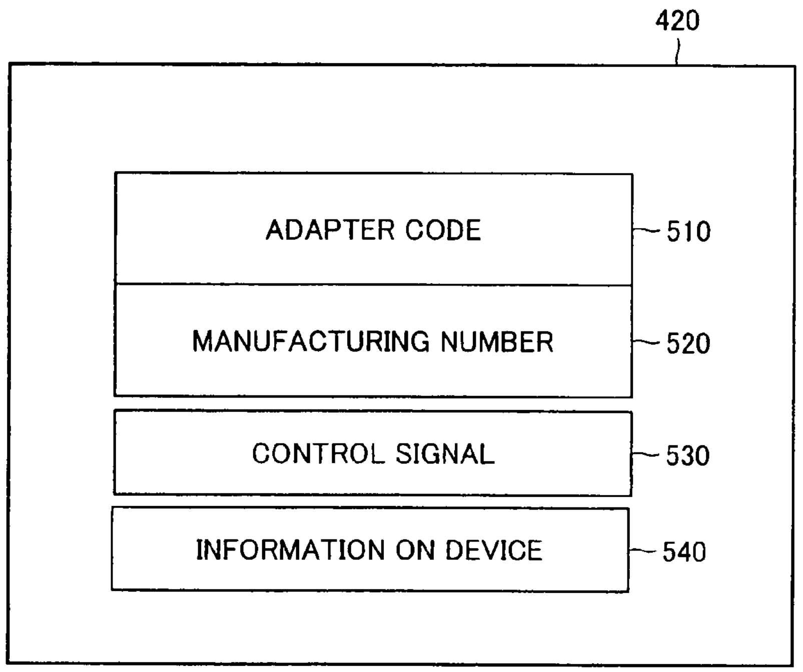
FIG. 6 shows one manner of data storage in flash memory.

Referring to FIG. 6, a data structure of remote controller adapter 200 will be described. FIG. 6 is one manner of data storage in flash memory 420. Flash memory 420 includes data storage areas 510, 520, 530, and 540. Adapter code for identifying remote controller adapter 200 is stored in area 510. The adapter code is code addressing the device to which remote controller adapter 200 is attached. The manufacturing number allotted by the manufacturer when remote controller adapter 200 is manufactured is stored in area 520. Information representing the content of a control signal is stored in area 530 by the manufacturer when remote controller adapter 200 is manufactured. "Information representing the content of a control signal" refers to information of a control signal to be output to a device such as television set 100. This signal content is associated with a control signal transmitted from remote controller 130. When the control signal transmitted from remote controller 130 is a broadcast signal, the control signal output from remote controller adapter 200 to a device such as television 100 is a signal representing the operation to be performed by the device in response to the broadcast command. When the control signal transmitted from remote controller 130 is not a broadcast signal, the control signal output from remote controller adapter 200 to a device such as television 100 is a signal representing the same control as the control signal transmitted from remote controller 130. The information representing the content of the control signal is stored in advance, in association with the control signal transmitted from remote controller 130. Information on the device to which remote controller adapter 200 is attached is stored in area 540. The information on the device to which remote controller adapter 200 is attached includes the manufacturer's code information and device number information of the device. Remote controller adapter 200 is specified by the adapter code, the manufacturing number and information on the device. Such data is read by optical ID signal generating circuit 434, and an optical signal is generated.

The data stored in flash memory 420 for specifying remote controller adapter 200 is not limited to the example shown in FIG. 6, and it may be rewritable. Accordingly, information representing a control content corresponding to a broadcast command may be information that can be arbitrarily set by a user by teaching or any other method.

Figure 7:
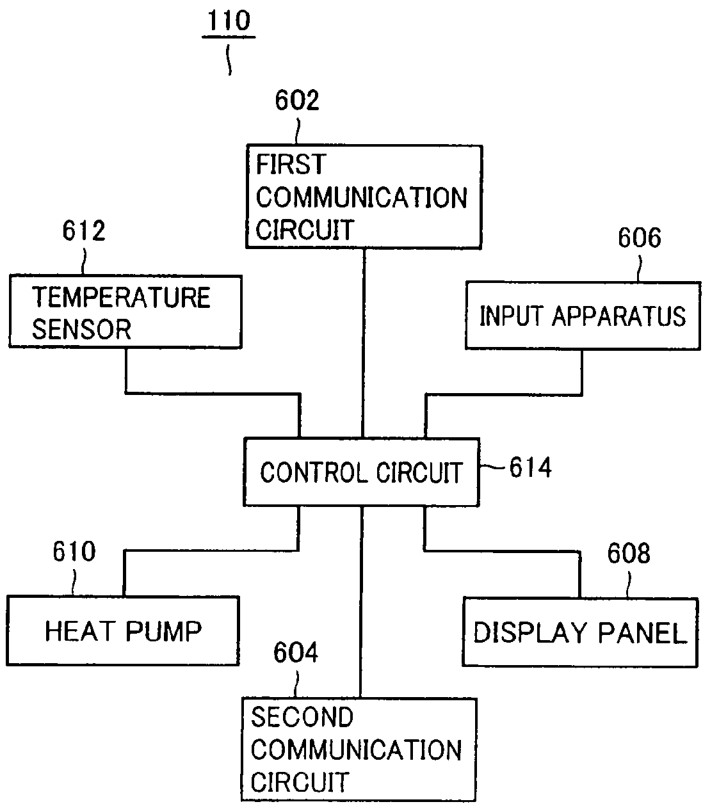
FIG. 7 is a block diagram showing a hardware configuration of an air conditioner.

FIG. 7 is a block diagram showing a hardware configuration of air conditioner 110. Referring to FIG. 7, air conditioner 110 includes a first communication circuit 602, a second communication circuit 604, an input apparatus 606, a display panel 608, a heat pump 610, a temperature sensor 612, and a control circuit 614. First communication circuit 602 receives an infrared signal from remote controller 130. Second communication circuit 604 transmits a trigger signal to remote controller 130. In the present embodiment, the communication protocol of a trigger signal is based on ZigBee (registered trademark). This does not limit the communication protocol of the trigger signal. Input apparatus 606 receives an input of a command from a user. Display panel 608 displays information. Heat pump 610 releases heat inside living room 10 to the outside, or introduces the outside heat into living room 10. Temperature sensor 612 outputs a trigger signal when the temperature inside living room 10 exceeds an upper limit value or a lower limit value. Control circuit 614 controls first communication circuit 602, second communication circuit 604, input apparatus 606, display panel 608, heat pump 610, and temperature sensor 612.

Figure 8:
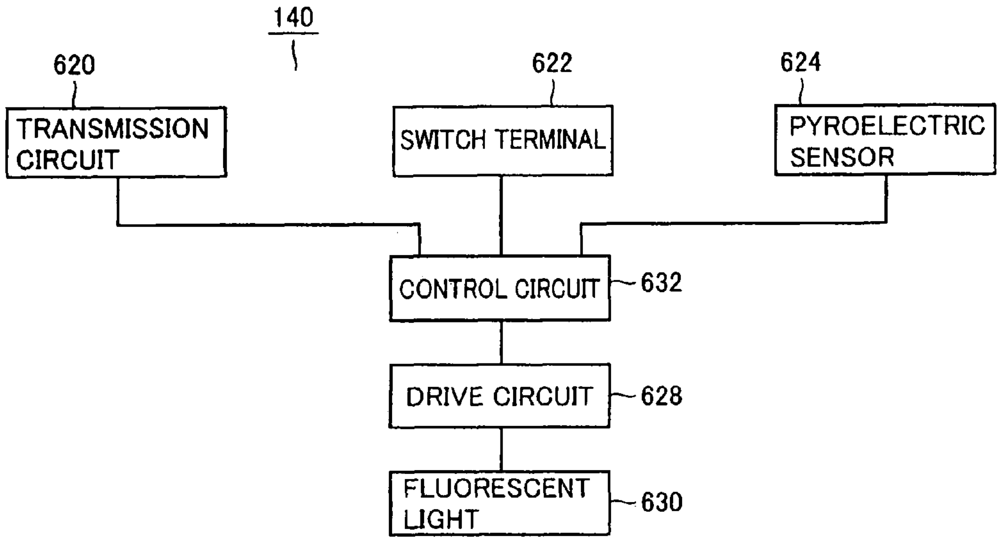
FIG. 8 is a block diagram showing a hardware configuration of a light of a vestibule.

FIG. 8 is a block diagram showing a hardware configuration of vestibule light 140. Referring to FIG. 8, vestibule light 140 includes a transmission circuit 620, a switch terminal 622, a pyroelectric sensor 624, a drive circuit 628, a fluorescent light 630, and a control circuit 632. Transmission circuit 620 sends a trigger signal to remote controller 130. Switch terminal 622 opens and closes transmission circuit 620 and other circuits constituting vestibule light 140. Pyroelectric sensor 624 senses the movement of humans. Drive circuit 628 drives fluorescent light 630. Fluorescent light 630 emits light. Control circuit 632 controls circuits and terminals constituting vestibule light 140. In the present embodiment, light 150 of the Japanese-style room on the second floor and living room light 160 are configured similarly as vestibule light 140. Accordingly, detailed description thereof is not repeated herein.

Figure 9:
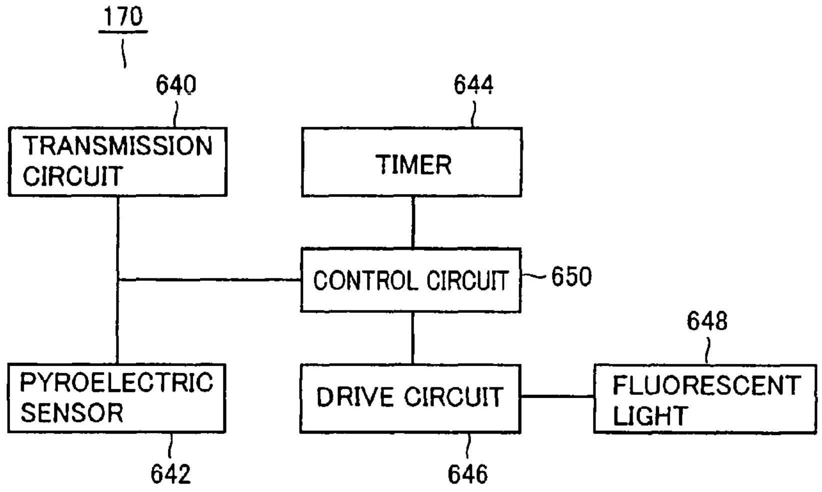
FIG. 9 is a block diagram showing a hardware configuration of a footlight.

FIG. 9 is a control block diagram of footlight 170. Referring to FIG. 9, footlight 170 includes a transmission circuit 640, a pyroelectric sensor 642, a timer 644, a drive circuit 646, a fluorescent light 648, and a control circuit 650. Transmission circuit 640 transmits a trigger signal to remote controller 130. Pyroelectric sensor 642 senses the movement of humans. Timer 644 senses that a predetermined time has elapsed. When pyroelectric sensor 642 senses the movement of humans, drive circuit 646 drives fluorescent light 648. Fluorescent light 648 emits light. Control circuit 650 controls circuits and terminals constituting footlight 170. In the present embodiment, security light 190 is configured similarly as footlight 170. Accordingly, detailed description thereof is not repeated herein.

Figure 10:
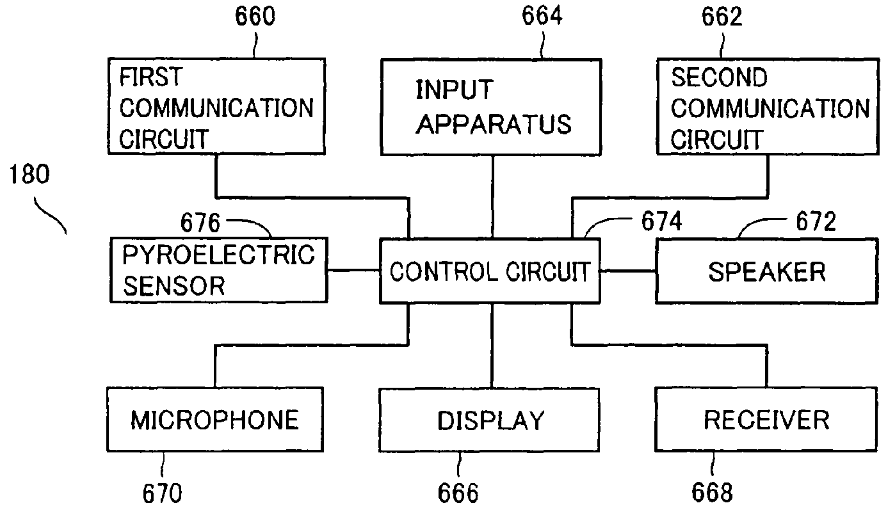
FIG. 10 is a block diagram showing a hardware configuration of a telephone.

FIG. 10 is a control block diagram of telephone 180. Referring to FIG. 10, telephone 180 includes a first communication circuit 660, a second communication circuit 662, an input apparatus 664, a display 666, a receiver 668, a microphone 670, a speaker 672, a control circuit 674, and a pyroelectric sensor 676. First communication circuit 660 communicates with an arbitrary telephone through a telephone line. Second communication circuit 662 transmits a trigger signal to remote controller 130. Input apparatus 664 receives an input such as a telephone number from a user. Display 666 displays, when there is an incoming call, the telephone number of the caller. Receiver 668 converts voice into a signal, or a signal into voice. Microphone 670 converts voice into a signal. Speaker 672 converts a signal into voice. Control circuit 674 controls first communication circuit 660, second communication circuit 662, input apparatus 664, display 666, receiver 668, microphone 670, and speaker 672. Pyroelectric sensor 676 senses the movement of humans.

Figure 11:
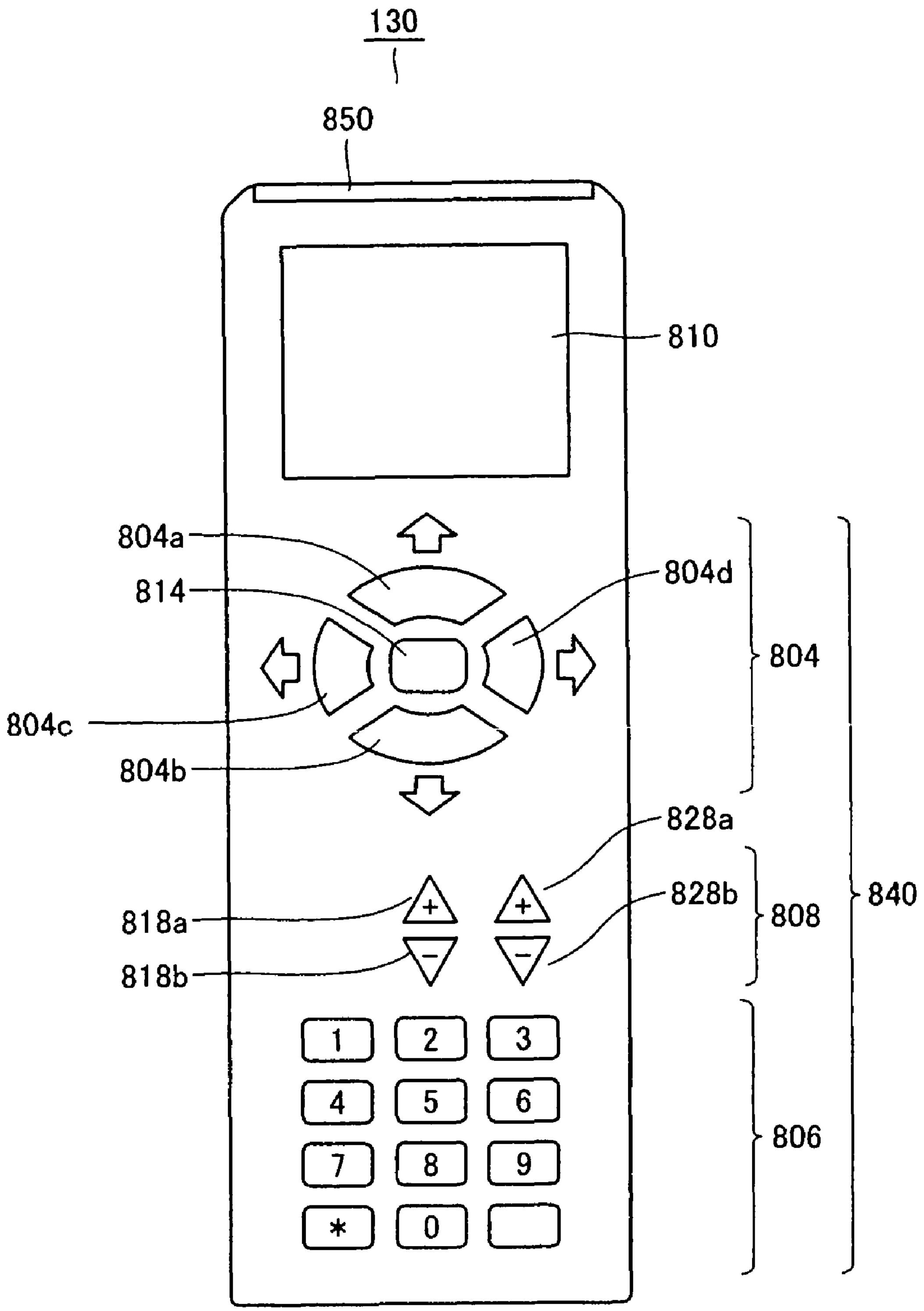
FIG. 11 shows the exterior of a remote controller.
Figure 12:
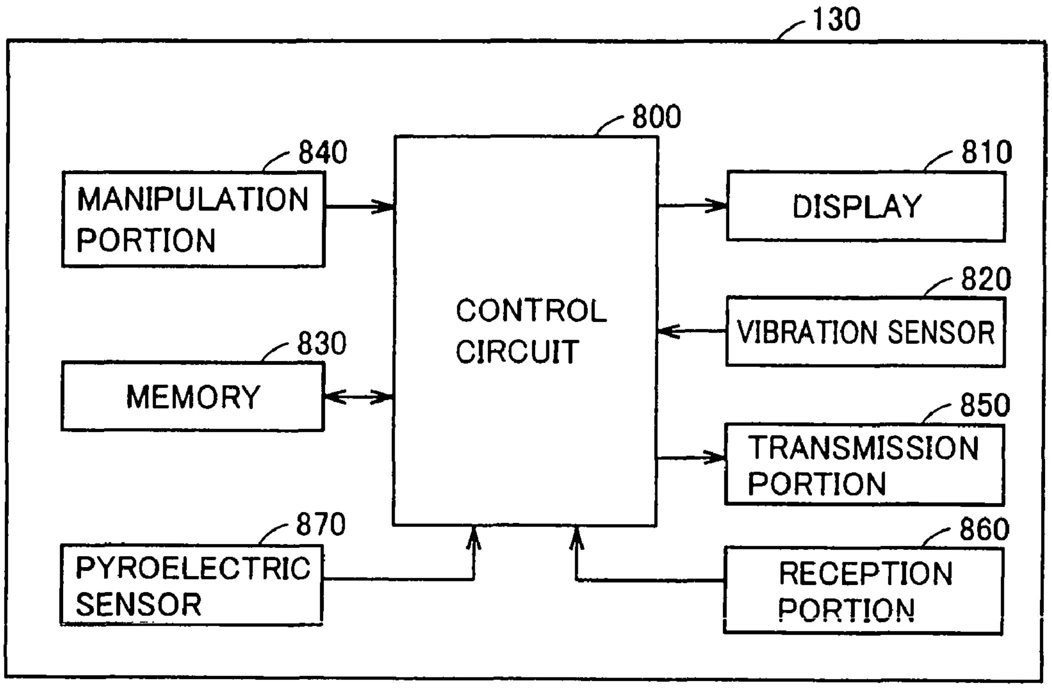
FIG. 12 is a block diagram showing a hardware configuration of the remote controller.

Referring to FIGS. 11 and 12, remote controller 130 according to the present embodiment will be described. FIG. 11 shows the exterior of remote controller 130.

Remote controller 130 includes a display 810, a manipulation portion 840 receiving an externally input instruction and outputting a signal corresponding to the input, and a transmission portion 850 emitting a control signal to a controlled device.

Display 810 is implemented by a liquid crystal display, an organic EL (Electro Luminescent) display or the like.

Manipulation portion 840 is implemented by buttons or a dial, for example. Manipulation portion 840 includes cursor buttons 804*a*, 804*b*, 804*c*, and 804*d* defining up, down, left and right directions of a cursor displayed on display 810, an enter button 814 accepting an input of an instruction that confirms the data having been input by a user of remote controller 130, and up/down buttons 808 for increasing or reducing the value of a control signal being output, and number buttons 806. Up/down buttons 808 includes a first up button 818*a*, a first down button 818*b*, a second up button 828*a*, and a second down button 828*b*.

FIG. 12 is a block diagram showing a hardware configuration of remote controller 130. Remote controller 130 includes control circuit 800, display 810, a vibration sensor 820, memory 830, manipulation portion 840, transmission portion 850, a reception portion 860, and a pyroelectric sensor 870.

Control circuit 800 generates a signal corresponding to the manipulation by a user to manipulation portion 840. Control circuit 800 sends the generated signal to transmission portion 850. Control circuit 800 may be implemented by a circuitry element configured in advance to execute each processing. In other cases, it may be realized by causing a CPU (Central Processing Unit) or other arithmetic processing unit to execute a program for realizing each processing.

Display 810 displays an image based on the signal generated by control circuit 800. Vibration sensor 820 senses vibration received by remote controller 130.

Memory 830 stores data in a non-volatile manner. Memory 830 is implemented by, for example, flash memory. Memory 830 receives an input of data for specifying the function of a controlled device, and writes it to a predetermined area.

Manipulation portion 840 outputs to control circuit 800 an electric signal corresponding to the input instruction. Control circuit 800 executes a predetermined processing corresponding to the signal. In the present embodiment, a signal generated by control circuit 800 in response to the manipulation of manipulation portion 840 is determined in advance. The signal does not change depending on the device controlled by remote controller 130.

The signal output from control circuit 800 is transmitted externally by transmission portion 850. In the present embodiment, transmission portion 850 transmits an infrared signal. It should be noted that the outputting manner of the control signal is not limited to the infrared signal. For example, it may be a transmission based on Bluetooth (registered trademark) or any other radio communication technique.

Reception portion 860 receives a trigger signal from television set 100, air conditioner 110, pyroelectric sensor 125, vestibule light 140, light 150 of the Japanese-style room on the second floor, living room light 160, footlight 170, telephone 180, or security light 190. In the present embodiment, reception portion 860 is connected to a communication line to execute processing of transmitting a control signal as a packet. The outputting manner of the control signal is not limited to the infrared signal. For example, it may be a transmission based on Bluetooth (registered trademark) or any other radio communication technique. Pyroelectric sensor 870 senses the movement of humans.

Figure 13:
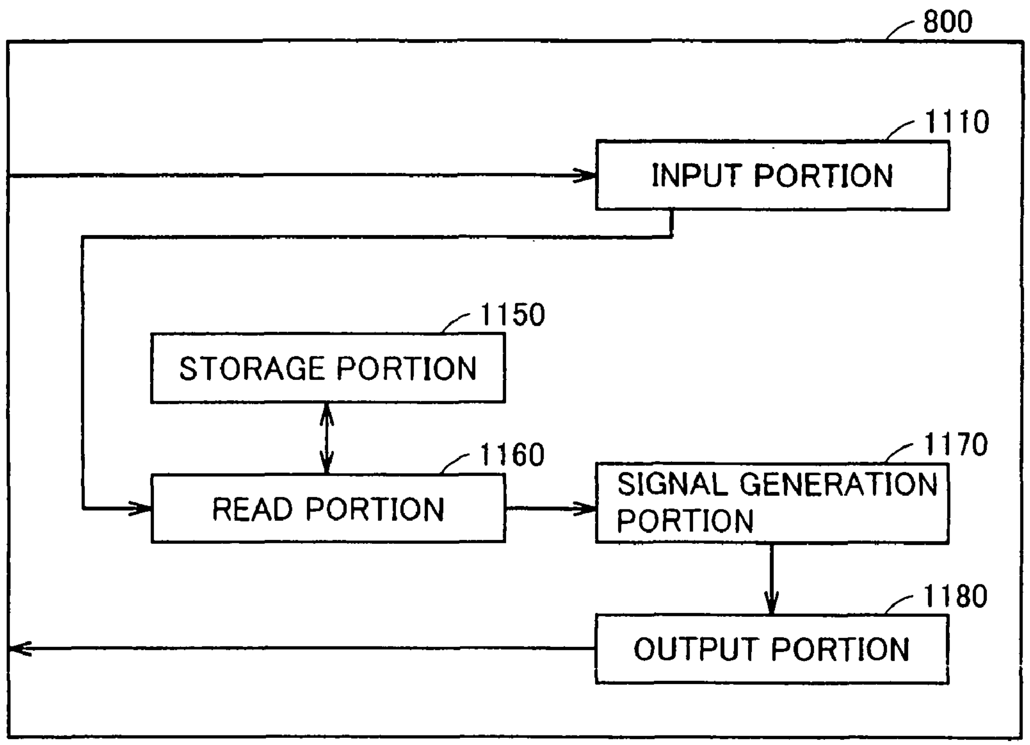
FIG. 13 is a block diagram showing a functional configuration of a control circuit.

Next, referring to FIG. 13, a functional configuration of control circuit 800 of remote controller 130 will be described. FIG. 13 is a functional block diagram of control circuit 800.

Control circuit 800 includes an input portion 1110 receiving an externally input signal, a storage portion 1150 storing various information, a read portion 1160 reading data stored in storage portion 1150 based on the input via input portion 1110, a signal generating portion 1170 generating a signal for controlling a controlled device based on the data read by read portion 1160, and an output portion 1180 outputting the signal generated by signal generating portion 1170.

FIG. 14 shows information of control signals stored in storage portion 1150 and the contents of control executed when such control signals are transmitted. The "events" shown in FIG. 14 indicate names given to information of control signals stored in storage portion 1150 for the sake of convenience. In the present embodiment, what is actually stored in storage portion 1150 as the information of control signals is code data of control signals associated with "Beginning of Mealtime" and other names. The "events" shown in FIG. 14 are associated with situations respectively sensed by a plurality of sensors. In the present embodiment, "a plurality of sensors" refer to the pyroelectric sensors, the temperature sensors and the like included in television set 100, air conditioner 110, pyroelectric sensor 125, vestibule light 140, light 150 of the Japanese-style room on the second floor, living room light 160, footlight 170, telephone 180, and security light 190. Television set 100, air conditioner 110, pyroelectric sensor 125, vestibule light 140, light 150 of the Japanese-style room on the second floor, living room light 160, footlight 170, telephone 180, and security light 190 each transmit information, as a trigger signal, representing the situation sensed by each sensor. In the present embodiment, together with the code data of control signals, data representing the values of trigger signals is also stored in storage portion 1150. It is noted that, as to the event of "Enter Living Room", only the data of pyroelectric sensor 870 of remote controller 130 is associated. The mark "–" in FIG. 14 means that no trigger signal value is associated with a control signal. The indication "ON" or "OFF" in FIG. 14 expresses the value of a trigger signal associated with a control signal. An address where code data of a control signal is stored and an address where data representing a value of a trigger signal maintain a certain spacing from each other. In this manner, storage portion 1150 stores information of control signals in association with combinations of situations respectively sensed by a plurality of sensors. In the present embodiment, the data table constituted of such data is referred to as an "event table". The information of control signals shown in FIG. 14 is stored in advance before remote controller 130 is used.

Figure 15:
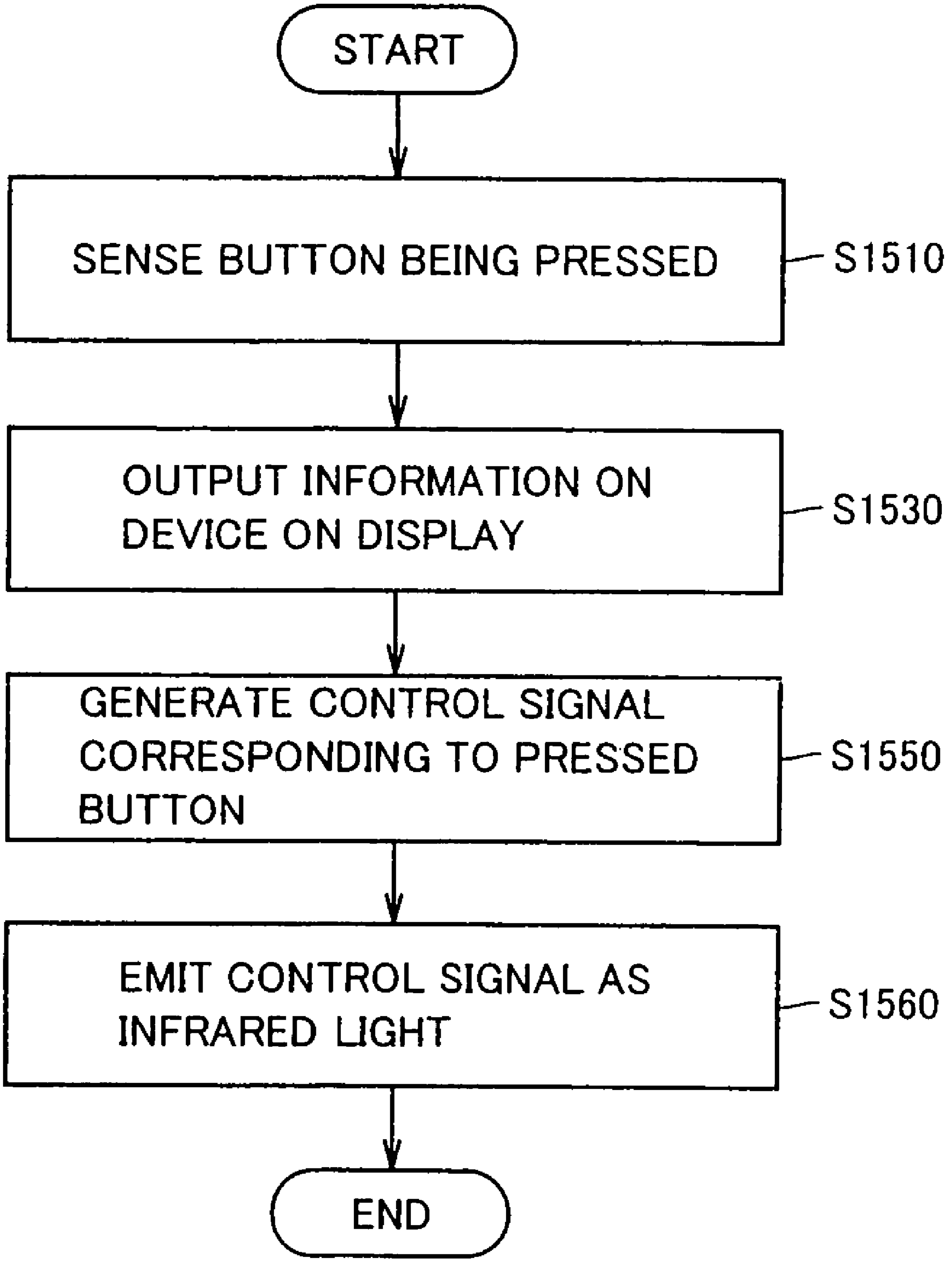
FIG. 15 is a flowchart showing a procedure of processing executed by a remote controller for controlling a controlled device.

Next, referring to FIG. 15, the control structure of remote controller 130 will be described again. FIG. 15 is a flowchart representing a procedure of processing executed by remote controller 130 for controlling a controlled device.

In step S1510, control circuit 800 senses a button being pressed, based on an input via manipulation portion 840.

In step S1530, control circuit 800 outputs information of the device controlled by remote controller 130 on display 810. Information display 810 displays the information of the device. In the present embodiment, the device controlled by remote controller 130 is set in advance by a user.

In step S1550, control circuit 800 generates a control signal corresponding to the pressed button. In step S1560, control circuit 800 outputs infrared light representing the control signal via transmission portion 850.

Figure 16:
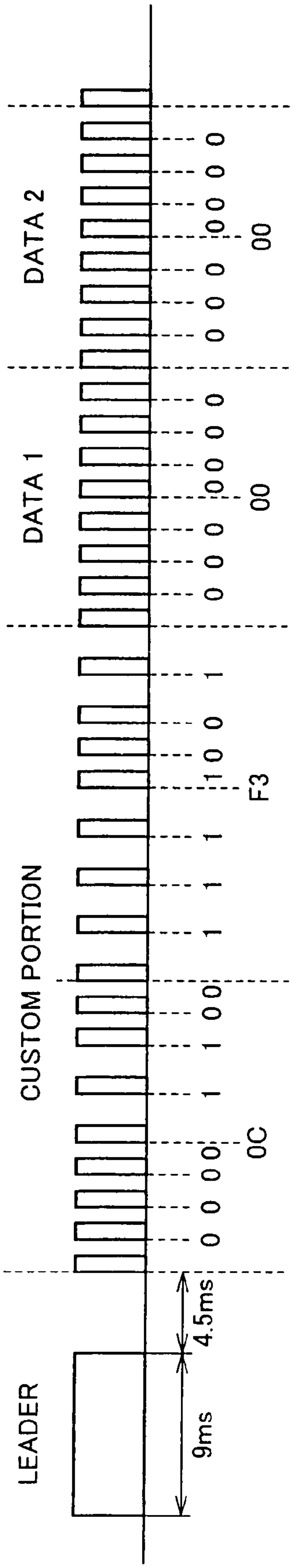
FIG. 16 shows a format of remote control code transmitted from the remote controller.

FIG. 16 shows a format of remote control code transmitted from remote controller 130. In the present embodiment, the remote control code signal transmitted from remote controller 130 includes a leader, a custom portion, and a data portion. The leader represents that a remote control code signal is about to be transmitted. The custom portion represents the name of the manufacturer of the device to be controlled. The data portion represents the content of control. In the present embodiment, the custom portion and the top part of the data portion represent the controlled device. The rest of the data portion represents the content of control. When the remote control code representing a broadcast command is transmitted, control circuit 800 generates a control signal in which a signal included in the custom portion represents a prescribed value, irrespective of the device being controlled by remote controller 130. The "prescribed value" is not particularly limited. When the signal included in the custom portion represents the prescribed value, the top portion of the data portion represents the type of broadcast command.

Figure 17:
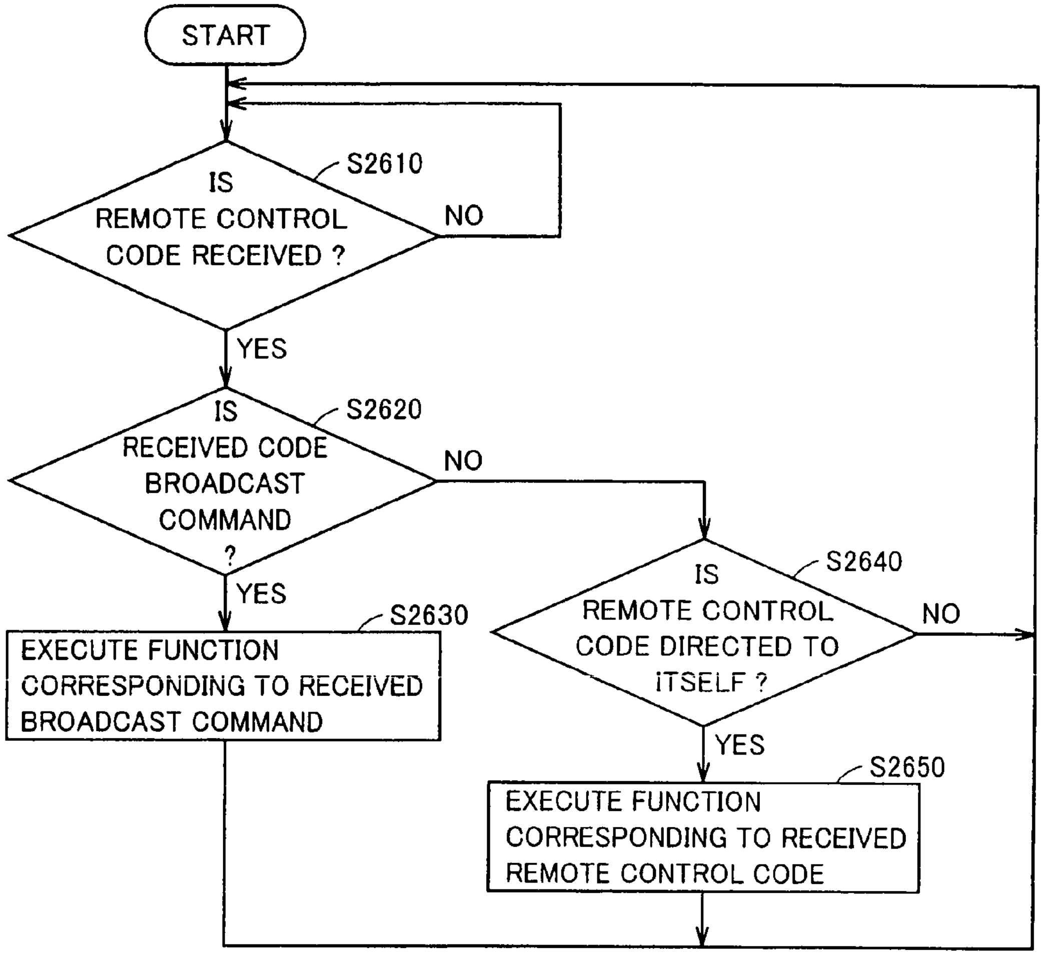
FIG. 17 is a flowchart showing a procedure of execution processing of a broadcast command.

Referring to FIG. 17, the program realized by remote controller adapter 200 according to the present embodiment executes the following control, in relation to the execution of the broadcast command.

In step S2610, control circuit 430 of remote controller adapter 200 determines whether or not reception circuit 410 has received a control signal from remote controller 130. When it is determined that reception circuit 410 has received a control signal (YES in S2610), the control moves to step S2620. Otherwise (NO in S2610), the control goes back to step S2610.

In step S2620, control circuit 430 of remote controller adapter 200 determines whether or not the remote control code received by reception circuit 410 represents a broadcast command, based on the custom portion and the top portion of the data portion of the remote control code. When it is determined that it represents the broadcast command (YES in step S2620), the control goes to S2630. Otherwise (NO in step S2620), the control moves to step S2640.

In step S2630, control circuit 430 of remote controller adapter 200 executes a function corresponding to the broadcast command received by reception circuit 410. That is, control circuit 430 executes the following processing. The first processing is to read data associated with the control signal received by reception circuit 410 out of the data representing broadcast commands stored in flash memory 420. The second processing is to generate a control signal in association with the data read in the first processing. Through such processing, a control signal is generated in association with the control signal received by reception circuit 410 and with the information stored in flash memory 420. The third processing is to output infrared light representing the control signal generated in the second processing via transmission circuit 440. Through such processing, transmission circuit 440 transmits the control signal generated by control circuit 430. Here, when the broadcast command is received by HDD recorder 120, HDD recorder 120 may execute the following processing. The first processing is to read data representing the broadcast command, being stored in memory 830. The second processing is to operate based on the data read in the first processing.

In step S2640, control circuit 430 of remote controller adapter 200 determines whether the remote control code received in step S2610 is directed to itself When it is determined that the remote control code is directed to itself (YES in step S2640), the control moves to step S2650. Otherwise (NO in step S2640), the control moves to step S2610.

In step S2650, control circuit 430 of remote controller adapter 200 executes the function corresponding to the received remote control code. That is, control circuit 430 executes the following processing. The first processing is to read data associated with the received remote control code stored in flash memory 420. The second processing is to generate a control signal in association with the data read in the first processing. The third processing is to output infrared light representing the control signal generated in the second processing via transmission circuit 440.

Figure 18:
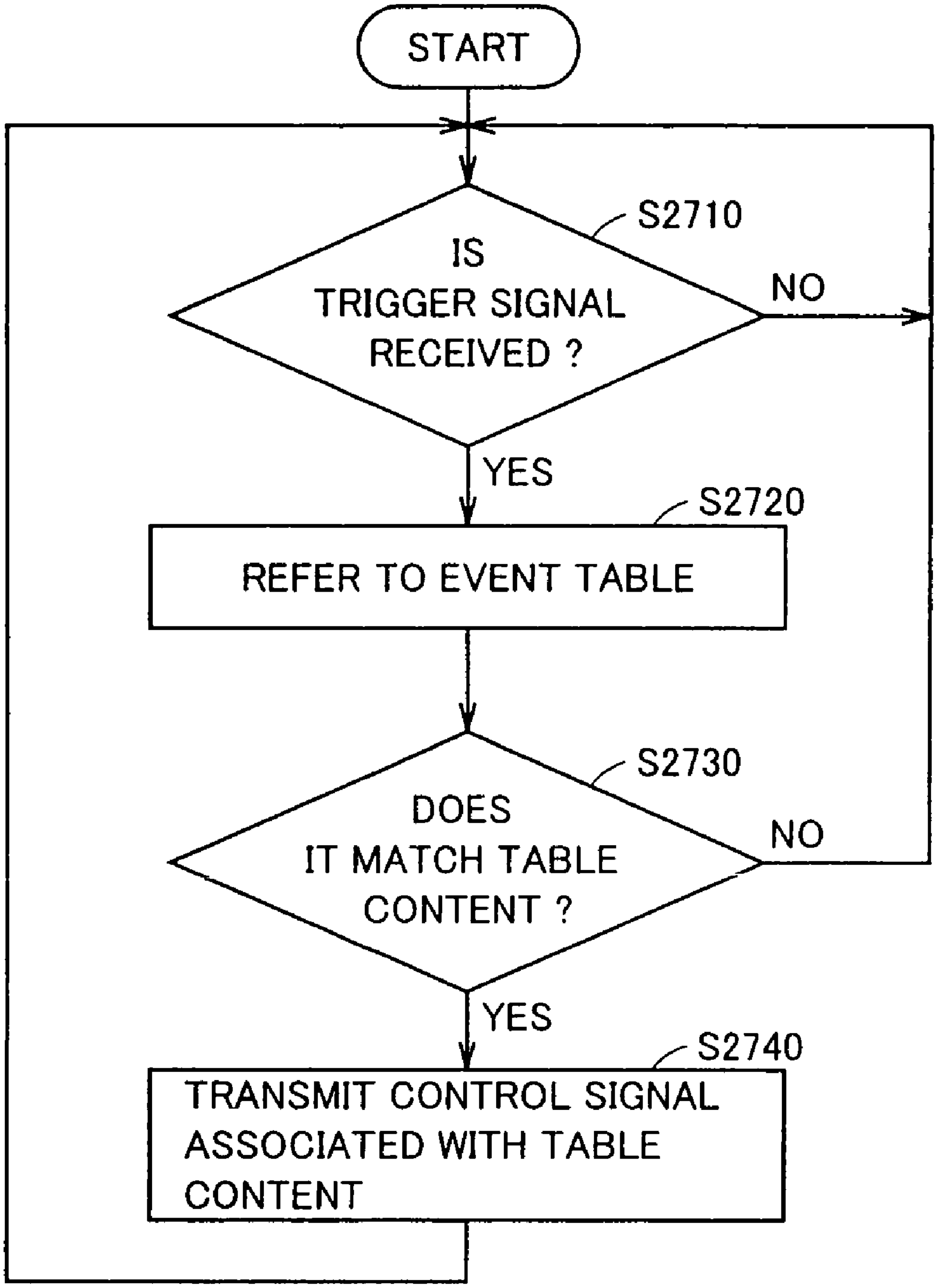
FIG. 18 is a flowchart showing a procedure of an operation when an event occurs.

Referring to FIG. 18, the program executed by remote controller 130 executes the following control, in relation to the operation when an event occurs.

In step S2710, reception portion 860 receives a trigger signal from a transmitter that is included in each of television set 100, air conditioner 110, pyroelectric sensor 125, vestibule light 140, light 150 of the Japanese-style room on the second floor, living room light 160, footlight 170, telephone 180, and security light 190, and that is connected to a sensor included in each of these devices. The trigger signal represents a situation sensed by the sensor included in television set 100, air conditioner 110, pyroelectric sensor 125, vestibule light 140, light 150 of the Japanese-style room on the second floor, living room light 160, footlight 170, telephone 180, or security light 190. When the trigger signals are received, control circuit 800 of remote controller 130 determines whether reception portion 860 has received the trigger signals. When it is determined that the trigger signals have been received (YES in step S2710), the control moves to step S2720. Otherwise (NO in step S2710), the control goes back to step S2710.

In step S2720, control circuit 800 of remote controller 130 refers to the event table store in memory 830. That is, control circuit 800 sequentially compares the values of trigger signals received by reception portion 860 with the values of trigger signals contained in the event table.

In step S2730, control circuit 800 of remote controller 130 determines whether a combination of the trigger signals received by reception portion 860 matches any combination of trigger signals represented by the values contained in the event table. When it is determined that there is a match (YES in step S2730), the control moves to S2740. Otherwise (NO in step S2730), the control goes back to step S2710.

In step S2740, signal generation portion 1170 of remote controller 130 generates a broadcast signal, in association with a combination of situations represented by the information received as trigger signals by reception portion 860 and with the information in the event table. Thus, the generated broadcast signal code satisfies the following requirements. The first requirement is that the generated broadcast signal code matches any of code stored as the event table in storage portion 1150. The second requirement is that the situation associated in the event table with the code satisfying the first requirement matches the event represented by the information received as a trigger signal by reception portion 860. In the present embodiment, "the situation associated in the event table" refers to the situations represented by a plurality of pieces of information which are serial in the order of reception with the reception interval being not more than a threshold value, among the information received by reception portion 860. Transmission portion 850 of remote controller 130 transmits the generated broadcast signal. In the present embodiment, the threshold value in this definition is defined when remote controller 130 is designed, for example. Transmission portion 850 of remote controller 130 transmits the generated broadcast signal. Remote controller adapter 200 and HDD recorder 120 recognize that the control signal represents a broadcast command, based on the content of the custom portion of the remote control code represented by the control signal.

An operation of the control system based on the above-described structure and flowcharts will be described.

At the Beginning of Mealtime

As a housewife leaves the kitchen to let others know that dinner is ready, pyroelectric sensor 676 of telephone 180 senses the movement of the human. Under control of control circuit 674, second communication circuit 662 transmits a trigger signal to remote controller 130. This is represented by the expression "ON" in the row of "Beginning of Mealtime" in FIG. 14. In this case, since there is no one in the vestibule, transmission circuit 620 of vestibule light 140 transmits a trigger signal representing that there is no one in the vestibule. This is represented by the expression "OFF" in the row of "Beginning of Mealtime" in FIG. 14.

Reception portion 860 of remote controller 130 receives a trigger signal from a transmitter that is included in each of television set 100, air conditioner 110, pyroelectric sensor 125, vestibule light 140, light 150 of the Japanese-style room on the second floor, living room light 160, footlight 170, telephone 180, and security light 190, and that is connected to a sensor included in each of these devices. Control circuit 800 determines whether reception portion 860 has received the trigger signals from television set 100, air conditioner 110, pyroelectric sensor 125, vestibule light 140, light 150 of the Japanese-style room on the second floor, living room light 160, footlight 170, telephone 180, and security light 190 (step S2710). In this case, as it is determined that the trigger signals have been received (YES in step S2710), control circuit 800 of remote controller 130 sequentially compares the values of trigger signals received by reception portion 860 with the values of trigger signals contained in the event table (step S2720).

When the comparison of the trigger signals is finished, control circuit 800 of remote controller 130 determines which trigger signal values contained in the event table matches the values of the trigger signals received by reception portion 860 (step S2730). As can be seen from the content of the event table of FIG. 14, the values of the trigger signals received by reception portion 860 match the values of trigger signals as to the event "Beginning of Meal" (YES in step S2730), transmission portion 850 of remote controller 130 transmits a control signal representing a broadcast command using "code representing a broadcast command" contained in the event table (step S2740).

Control circuit 430 of remote controller adapter 200 determines whether or not reception circuit 410 has received remote control code (step S2610). In this case, since it is determined that reception circuit 410 has received remote control code (YES in S2610), control circuit 430 of remote controller adapter 200 determines whether or not the remote control code received by reception circuit 410 represents a broadcast command (step S2620). In this case, since it is determined that it represents the broadcast command (YES in step S2620), control circuit 430 of remote controller adapter 200 executes a function corresponding to the broadcast command received by reception circuit 410 (step S2630). That is, control circuit 800 executes the following processing.

The first processing is to read data representing a broadcast command stored in flash memory 420.

The second processing is to generate a control signal in association with the data read in the first processing. As to the event of "Beginning of Mealtime", remote controller adapters 200 respectively attached to television set 100, HDD recorder 120, and footlight 170 each generate a control signal for turning the power on.

The third processing is to output infrared light representing the control signal generated in the second processing via transmission circuit 440.

As described above, the control system according to the present embodiment communicates a broadcast signal, being triggered by a change in the movement of humans or in the environment of a room sensed by sensors. Thus, in contrast to the operation of a device such as "turning on/off the power of a television set" manipulated with a remote controller as in a conventional manner, it becomes possible to realize the control that addresses an action of a user such as "going to bed", "spending time in the morning until going to work" and the like, which is not directly associated with an operation of a device.

There is a remote controller called a learning remote controller that realizes a plurality of types of control with single manipulation, by having several control commands registered such that they are executed sequentially. Though such a remote controller can also realize the control addressing an action of a user not directly associated with an operation of a device, the commands must be registered again when the device is newly purchased. The control system according to the present embodiment can realize the similar control without the necessity of complicated registering. As a result, it becomes possible to provide a remote controller and a remote control system that can infer the intention of a user and that can control a plurality of devices based on the inferred intention.

It is noted that the remote controller according to a first modification of the present embodiment may transmit to a device that is incapable of sensing a broadcast signal for a reason of, for example, not having remote controller adapter 200 attached, not a broadcast signal but a control signal representing control to be executed by a broadcast command. Thus, it becomes possible to cause a device incapable of sensing a broadcast signal to execute a broadcast command.

Further, remote controller adapter 200 according to a second modification of the present embodiment may be capable of adding or changing information of control represented by a broadcast command. Examples of such a scheme include a method wherein remote controller 130 transmits information, a method wherein a memory media is employed, a method wherein a network interface is used, and a method wherein a user inputs using a DIP switch.

Still further, in the second modification of the present embodiment, "the situation associated in the event table" in step S2740 may not be serial in the order of reception. "The situation associated in the event table" in step S2740 may represent situations represented by a plurality of pieces of information with the reception interval exceeding a threshold value, among the information received by reception portion 860.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A remote controller controlling a plurality of devices each including a sensor and a transmitter connected to said sensor, comprising:

a transmission portion;

an input device configured to accept an instruction to the remote controller;

memory configured to store, pieces of information of control signals respectively controlling said devices, wherein pieces of information are stored in association with combinations of situations respectively sensed by said sensors;

a display device configured to display information of an apparatus controlled by the remote controller;

a reception portion configured, to receive signals respectively representing a human's movement, wherein each of the signals is sent by each said transmitter;

a determination circuit configured to determine whether or not a combination of each of the signals received by the reception portion matches a combination of the pieces of information stored in the memory; and a generator configured to generate a control signal for controlling an apparatus, wherein said generator is configured to:

generate, in response to the instruction to the input device, a control signal for controlling an apparatus predetermined as an apparatus to be controlled by the remote controller; and generate, in association with the combinations of said situations represented by a plurality of signals received in serial order by said reception portion with a reception interval being at most a predetermined threshold value, and with said pieces of information stored in said memory, control signals respectively controlling said plurality of devices when the combination of each of the signals and the combination of the pieces of information match; and wherein the transmission portion is configured to transmit said generated control signals as infrared signals.

2. A remote controller controlling a plurality of devices, each including a sensor and a transmitter connected to the sensor, comprising:

a transmission portion;

an input device configured to accept an instruction to the remote controller;

a storage portion configured to store information of a control signal controlling said device, wherein the information is stored in association with situations sensed by said sensor;

a reception portion configured to receive signals respectively representing a human's movement, wherein each of the signals is sent by each said transmitter;

a determination portion configured to determine whether or not a combination of each of the signals received by the reception portion matches a combination of pieces of information stored in the storage unit; and a generator configured to generate a control signal for controlling an apparatus, wherein said generator is configured to:

generate, in response to the instruction to the input device, a control signal for controlling an apparatus predetermined as an apparatus to be controlled by the remote controller; and generate, in association with a combination of said situations situation represented by a plurality of signals received in serial order by said reception portion with a reception interval being at most a predetermined threshold value, and with said information stored in said storage portion, a control signal controlling said plurality of devices when the combination of each of the signals and the combination of the pieces of information match; and wherein the transmission portion is configured to transmit said generated control signal.

3. The remote controller according to claim 2, further comprising a sensor, wherein said generator generates said control signal in association with said situations sensed by said sensor and with said information stored in said storage portion.

4. A remote control system controlling a device, comprising a remote controller and an adapter, said device including a sensor and a transmitter connected to the sensor, wherein said remote controller includes:

a transmission portion;

an input device configured to accept an instruction to the remote controller;

a storage portion configured to store information of a control signal controlling said device, wherein the information is stored in association with situations sensed by said sensor;

a reception portion configured to receive signals respectively representing a human's movement, wherein each of the signals is sent by each said transmitter;

a determination portion configured to determine whether or not a combination of each of the signals received by the reception portion matches a combination of pieces of information stored in the storage unit; and a generator configured to generate a control signal for controlling an apparatus, wherein said generator is configured to:

generate, in response to the instruction to the input device, a control signal for controlling an apparatus predetermined as an apparatus to be controlled by the remote controller; and generate a control signal controlling said plurality of devices when the combination of each of the signals and the combination of the pieces of information match, wherein the control signal is generated in association with a combination of said situations represented by a plurality of signals received in serial order by said reception portion with a reception interval being at most a predetermined threshold value, and with said information stored in said storage portion;

wherein the transmission portion is configured to transmit said control signal generated by the generation portion, and wherein said adapter includes:

a storage portion configured to store in advance information of an operation signal in association with said control signal transmitted from said remote controller;

a reception portion configured to receive said control signal transmitted from said remote controller;

a generator configured to generate said operation signal, in association with said control signal received by said reception portion and with the information stored in said storage portion; and a transmission portion configured to generate said generated operation signal.

5. The remote control system according to claim 4, wherein said remote controller further includes a sensor, and wherein said generator of said remote controller generates said control signal in association with said situations sensed by said sensor and with said information stored in said storage portion.

6. The remote control system according to claim 4, further comprising a display device configured to display information of an apparatus controlled by the remote controller.

7. The remote control system according to claim 4, wherein the control signal includes at least any one of a control signal for switching an ON/OFF of an air conditioner, an ON/OFF of a television, an ON/OFF of an HDD recorder, or an ON/OFF of a light.

8. The remote controller according to claim 1, wherein the control signal includes at least any one of a control signal for switching an ON/OFF of an air conditioner, an ON/OFF of a television, an ON/OFF of an HDD recorder, or an ON/OFF of a light.

9. The remote controller according to claim 2, further comprising a display device configured to display information of an apparatus controlled by the remote controller.

10. The remote controller according to claim 2, wherein the control signal includes at least any one of a control signal for switching an ON/OFF of an air conditioner, an ON/OFF of a television, an ON/OFF of an HDD recorder, or an ON/OFF of a light.

* * * * *